June 14, 1927.

D. C. DAVIS

DEMAND METER

Filed Dec. 2, 1922

1,632,120

WITNESSES:
*J. H. Crock.*
*F. H. Miller.*

INVENTOR
David C. Davis.
BY
*Wesley G. Carr*
ATTORNEY

Patented June 14, 1927.

1,632,120

UNITED STATES PATENT OFFICE.

DAVID C. DAVIS, OF CHESTER, PENNSYLVANIA, ASSIGNOR TO WESTINGHOUSE ELECTRIC & MANUFACTURING COMPANY, A CORPORATION OF PENNSYLVANIA.

DEMAND METER.

Application filed December 2, 1922. Serial No. 604,570.

My invention relates to measuring instruments and particularly to instruments for determining and recording the rate of demand of a quantity to be measured.

One object of my invention is to provide a device of the above-indicated character that shall separately integrate a quantity to be measured over a plurality of equal and overlapping periods of time and that shall indicate the several integrated sums upon a common record.

Another object of my invention is to provide a demand instrument or meter that shall be simple and durable in construction and effective in its operation.

Heretofore, several forms of demand instruments have been suggested, such as those employing a plurality of movable members which are successively shifted in accordance with a quantity to be measured. In one form of instrument, the movable members function as balance members on a weighing device by which an indicating member is actuated in accordance with a running sum representing the demand of the quantity being measured. In another form of instrument, the movable members are moved, in certain combinations, in accordance with the instantaneous values of a quantity to be measured. Thus, a combination set up at one time is caused to operate differentially with respect to a combination set up at the end of a predetermined time interval distant from that time to indicate the demand of a quantity being measured.

To the best of my knowledge, any instrument employing a plurality of movable members, as above described, depends upon the co-operation of the members with each other and, further, does not separately actuate each of a plurality of devices or mechanisms, corresponding to said members, throughout a main demand observation period.

In practicing my invention, I provide a demand instrument in which each of a plurality of indicating members is actuated independently throughout a main observation period but in which each member so differs from the one next adjacent thereto, in the time of the inception of its movement, as to permit the observation of the demand for a given time interval beginning at any of closely initiated overlapping similar intervals. Further, means is provided by which all of the members co-operate with a common recording device.

Figure 1 of the accompanying drawings is a fragmentary side view, partially in elevation and partially in section of an instrument embodying my invention, showing a diagram of certain electrical circuits therefor.

Figure 1:
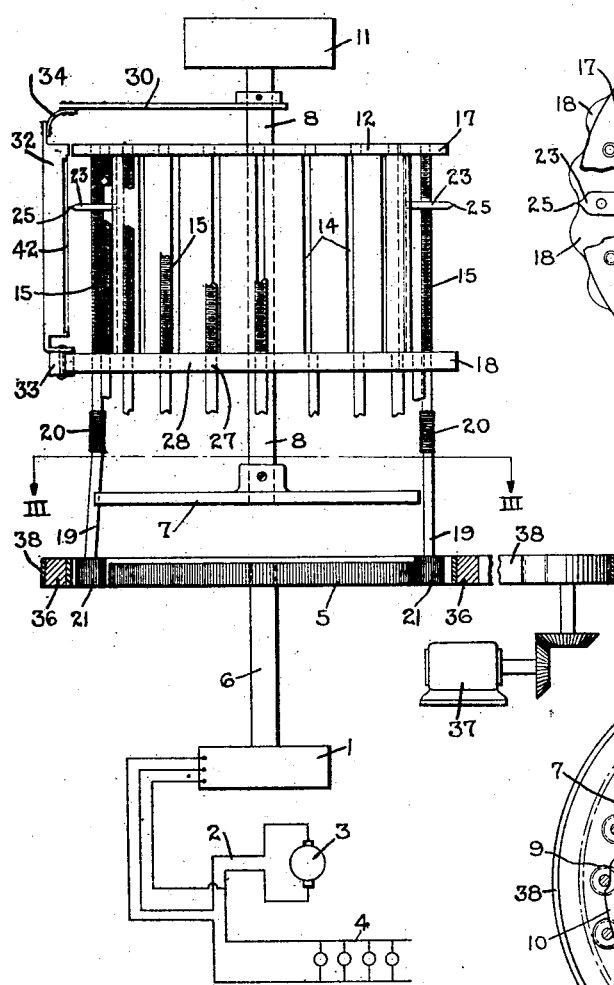
Figure 2:
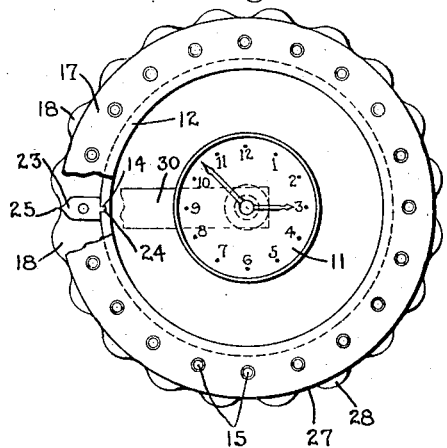
Fig. 2 is a plan view of the upper portion of the device shown in Fig. 1.
Figure 3:
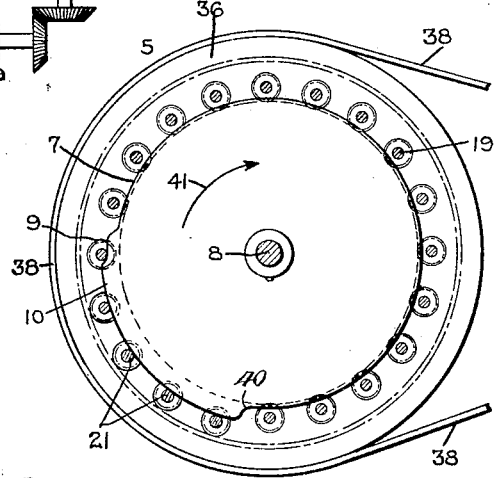
Fig. 3 is a view taken along the line III—III of Fig. 1.

A watthour meter 1, of any suitable or desired type and that may be energized from a circuit 2 having a source 3 of electromotive force and a load 4 therein, drives a gear wheel 5 through a shaft 6 of the meter.

A cam disk 7, mounted on a shaft 8 in axial alinement with the meter shaft 6, is of fixed radius for the major portion of its circumference and is provided with an intermediate-step portion 9 and a high-step portion 10. The disk 7 is driven at a uniform rate, through the shaft 8, as by a clock 11, or other suitable device, being turned, for example, once in twenty minutes in a device for indicating the energy used during fifteen-minute intervals.

A stationary cylinder 12, mounted in axial alinement with the members 5 and 7, is provided with a plurality of equally-spaced, parallel, outer elemental slots 14, there being, for example, twenty of these slots in a device for recording the energy consumed in fifteen-minute intervals, differing by one minute in inception. Threaded members 15 are rotatably mounted in flanges 17 and 18, on the cylinder 12, and each of the members 15 has an extending or operating portion 19 connected thereto by a resilient connecting portion 20. A pinion or gear member 21 may be provided at the free end of each portion 19.

Each threaded member 15 carries a nut 23 having a lug 24 extending through the corresponding slot 14 to prevent rotation of the nut. Each nut may, further, be provided with an outwardly projecting needle or marker point 25.

The flange 18 is of symmetrical wave form having a trough 27 radially opposite each member 15 and a crest 28 between each two adjacent members 15. A radial arm 30, carried by the clock shaft 8 to be driven at the same rate as the cam 7, is provided with a depending record holder 32 having a roller 33, at one end, bearing against the flange 18. The record holder may be provided with a sheet of ordinary paper to be perforated by a needle point or it may carry metal-face or indicator-card paper for co-action with a metal marker. A spring member 34, connecting the arm 30 and the record holder 32, biases the roller 33 inwardly against the flange 18.

A friction ring, or internal ring gear member 36 may surround the gear wheel 5, outside the pinions 21, or other suitable means be provided for periodic engagement with the pinions 21. The ring 36 may be driven by a relatively high-speed motor 37, through a belt 38 or be otherwise suitably driven, as by a step-up gear mechanism (not shown) driven from the clock 11.

Figure 4:
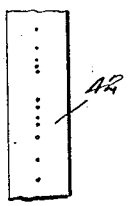
Fig. 4 is a face view of a record-chart shown at the upper left-hand side of Fig. 1.

In operation, assume a point 40, on the cam 7, to be passing one of the members 19, in the direction of an arrow 41, the member 19 in question having just left the high step 10 on the cam 7. With this action, the corresponding pinion 21 is permitted to engage the gear wheel 5. At the instant, the corresponding nut 23 is at its zero position against the flange 18. The pinion 21 is driven at a speed proportional to the speed of the meter 1 for a fifteen-minute period, the nut 23 rising, by reason of rotation of the corresponding member 15, to a height proportional to the integrated energy consumption over a fifteen-minute period. The low-step portion 9 of the cam 7 then engages the member 19, forcing the pinion out of engagement with the gear wheel 5 into a neutral position between the gear members 5 and 36. The arm 30 and the record holder 32 then pass the member 19 in question and the roller 33 drops into the corresponding trough 27 in the flange 18, permitting the marker or needle point 25 to mark or perforate a paper or other recording member 42, as shown by dots in Fig. 4, at a height corresponding to the integrated energy consumption during the fifteen-minute period in question. Further movement of the arm 30 forces the roller 33 on to the next crest 28, lifting the record 42 from the needle 25. At the same time, the high step 10 on the cam 7 engage the member 19, forcing it outwardly still further and bringing the pinion 21 into engagement with the rapidly rotating ring 36. The ring 36 then rotates the member 19 in the opposite direction to that imparted by the gear wheel 5 and returns the nut 23 to its zero position against the flange 18, slippage thereafter taking place until the pinion 21 is disengaged from the ring 36 by reason of the passing of the corresponding member 19 from the high cam step 10.

Where fifteen-minute periods, starting one minute apart, are to be integrated, there will preferably be twenty of the nuts 23 with their associated pinions 21, fifteen of the nuts, at any given time, slowly moving away from the flange 18, the record of one nut being taken and four nuts being returned to zero positions. The uniform progression of the cam 7 and the arm 30 frees each nut after it has been driven for fifteen minutes, records its height and returns it to its zero position.

At the end of a month, or some other major period, the record 42 will, of course, indicate a vast number of indications or perforations in a vertical line and the highest indication will indicate the customer's maximum peak load over a fifteen-minute period.

If it is desired to know when the peak load occurred, it is only necessary to substitute a usual record chart for the record 42 movable at a clock rate across the record holder 32, in which form the perforations or marks will be distributed in the form of a curve.

While I have shown and described my invention for the measurement of electrical energy, the demand of any other quantity, in response to which the gear member 5 may be caused to rotate, may be measured and other modifications and changes effected, without departing from the spirit and scope of my invention as set forth in the appended claims.

I claim as my invention—

1. A measuring instrument comprising a plurality of recording elements for co-operation with a chart, a meter element, means for successively connecting the recording elements to the meter element for actuation thereby over equal overlapping periods of time and for disconnecting the recording elements from the meter element and resetting the same to an initial position at the ends of said periods, and means for causing each recording element to effect a record on the chart.

2. The combination with a meter element, of a plurality of movable members, means for successively connecting said members to the meter element for actuation thereby over equal overlapping periods of time and for disconnecting said members from the meter element at the ends of said periods, a co-operating member normally disengaging said movable members, and means effecting relative movement between said co-operating member and each of said movable members to effect engagement between said co-operating member and each of said movable members in accordance with the relative positions thereof at the ends of the operating periods of the movable members.

3. A measuring instrument comprising a plurality of recording elements each actuated independently of the others in accordance with the values of a quantity to be measured integrated over a predetermined period of time, said time periods overlapping, and a chart co-operating with each recording element in accordance with its individual position for recording the integrated sums represented by all of said elements.

4. A measuring instrument comprising a plurality of elements movable independently during successive overlapping periods of time to give independent indications, means responsive to a quantity to be measured for actuating the same and means including constant-speed means for successively connecting said elements to said actuating means for predetermined periods of time and for moving said elements to zero positions.

5. A measuring instrument comprising a plurality of elements movable independently during successive overlapping periods of time to give independent indications, means responsive to a quantity to be measured for actuating the same and means including constant-speed means for successively connecting said elements to said actuating means for predetermined periods of time, for disconnecting said elements from the actuating means and for moving said elements to zero positions.

6. A measuring instrument comprising a plurality of equally spaced parallel rotatable shafts arranged in a stationary circle, each having a flexible intermediate portion, a screw-shaft portion at one side of said portion and an operating portion at the other side of said intermediate portion, a traveling nut on the screw-shaft portion, a gear member responsive to a quantity to be measured disposed opposite said operating portions, a resetting gear member also opposite said operating portions and a constant-speed rotatable cam for successively moving said operating portions into engagement with the quantity-responsive gear, for terminating said engagement and for moving said operating portions into engagement with said resetting gear member.

In testimony whereof, I have hereunto subscribed my name this 16th day of November, 1922.

DAVID C. DAVIS.